United States Patent
Suzuki et al.

(10) Patent No.: US 7,510,598 B2
(45) Date of Patent: Mar. 31, 2009

(54) GAS SEPARATING BODY AND METHOD FOR PRODUCING SAME

(75) Inventors: Kenji Suzuki, Nagoya (JP); Kenji Yajima, Nagoya (JP); Kunio Nakayama, Okazaki (JP); Toshihiro Tomita, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 443 days.

(21) Appl. No.: 11/353,602

(22) Filed: Feb. 14, 2006

(65) Prior Publication Data

US 2006/0144239 A1 Jul. 6, 2006

Related U.S. Application Data

(63) Continuation of application No. PCT/JP2004/012697, filed on Aug. 26, 2004.

(30) Foreign Application Priority Data

Aug. 27, 2003 (JP) ............... 2003-303582

(51) Int. Cl.
 *B01D 53/22* (2006.01)
 *B01D 71/02* (2006.01)
(52) U.S. Cl. .............. 96/11; 55/523; 427/244; 502/4
(58) Field of Classification Search ........ 96/4, 96/7, 9, 11; 95/43, 51; 55/523; 427/244, 427/419.3; 502/4, 60, 64
See application file for complete search history.

(56) References Cited

U.S. PATENT DOCUMENTS

| | | | | |
|---|---|---|---|---|
| 5,498,278 A | * | 3/1996 | Edlund | 96/11 |
| 6,074,457 A | * | 6/2000 | Anthonis et al. | 95/45 |
| 6,090,289 A | * | 7/2000 | Verduijn et al. | 210/644 |
| 6,667,265 B1 | | 12/2003 | Tomita et al. | |
| 6,716,275 B1 | * | 4/2004 | Reed et al. | 96/10 |
| 7,074,734 B2 | * | 7/2006 | Vu et al. | 502/4 |
| 2004/0167011 A1 | * | 8/2004 | Mori et al. | 502/4 |
| 2004/0173094 A1 | | 9/2004 | Nakayama et al. | |

FOREIGN PATENT DOCUMENTS

| | | |
|---|---|---|
| JP | 2000-189771 A1 | 7/2000 |
| JP | 2003-159518 A1 | 6/2003 |
| JP | 2003-210952 A1 | 7/2003 |
| WO | WO 00/23378 A1 | 4/2000 |

OTHER PUBLICATIONS

W. M. Meier, D.H. Olson and Ch. Bacrlocher, "Atlas of Zeolite Structure Types", Published on Behalf of the Structure Commission of the International Zeolite Association by Elsevier, Fourth Revised Edition, 1996.

* cited by examiner

*Primary Examiner*—Frank M Lawrence
(74) *Attorney, Agent, or Firm*—Burr & Brown (57) ABSTRACT

A gas separator is provided, including a porous substrate made of a first ceramic and a gas-separating layer containing zeolite disposed on the surface of the porous substrate. The gas-separating layer further contains, in addition to zeolite, a thermal expansion coefficient-adjusting material made of a second ceramic having a linear thermal expansion coefficient satisfying a predetermined relationship, so that the difference between the thermal expansion coefficient of the porous substrate and the gas-separating layer can be reduced.

9 Claims, 3 Drawing Sheets

GAS SEPARATING BODY AND METHOD FOR PRODUCING SAME

TECHNICAL FIELD

The present invention relates to a gas separator comprising a porous substrate and a gas-separating layer containing zeolite, formed on the surface of the porous substrate, as well as to a method for producing the gas separator. More particularly, the present invention relates to a gas separator which hardly generates defects such as cracks and the like in the gas-separating layer and is excellent in gas separating-ability, as well as to a method for producing a gas separator, capable of producing such a gas separator easily.

BACKGROUND ART

Zeolite is a kind of silicate having pores in the crystal structure and is present as a number of kinds (types) different in crystal structure (pore structure), such as LTA, MFI, MOR, AFI, FER, FAU, DDR and the like. These zeolites have own adsorptivities, catalyst performances, ion exchangeabilities, etc. based on respective crystal structures and chemical compositions and are in use in various application fields such as adsorbent, catalyst (catalyst support), ion exchanger and the like.

In recent years, zeolite has been used for gas separation due to inherent pores. For example, DDR (Deca-Dodecasil 3R) type zeolite [see, for example, W. M. Meier, D. H. Olson, Ch. Baerlocher, Atlas of zeolite structure types, Elsevier (1996)] composed mainly of silica ($SiO_2$) and containing, in the crystal structure, relatively small (in various zeolites) pores (pore diameter: 4.4×3.6 Å) of 8-membered oxygen ring is in use as a separating membrane for selective permeation and separation of gas [e.g. carbon dioxide ($CO_2$)] from mixed gas.

In such gas separation, a gas separator comprising a porous substrate (e.g. ceramic) and a gas-separating layer formed on the surface of the porous substrate are widely used for its sufficient amount of gas permeation and for its improved mechanical strength.

The above gas separator can be produced, for example, by a method which comprises adhering a zeolite powder as seed crystals on the surface of a porous substrate composed of a ceramic or the like, dipping the zeolite-adhered substrate in a solution of raw materials for zeolite synthesis, containing a structure-directing agent, water, a silicon (Si) source, etc., conducting, in this state, a heat treatment (a hydrothermal synthesis of zeolite), and further conducting a heat treatment in an oxygen-containing atmosphere (see, for example, JP-2003-159518).

In the above method, however, it was found that defects such as cracks and the like were generated in the gas-separating layer formed on the surface of the porous substrate during the heat treatment (conducted for burning-out of the structure-directing agent remaining in the synthesized zeolite). It was also found that even if no defects were regenerated during the production of the gas separator, defects such as cracks and the like were generated during use of the gas separator for gas separation. The presence of such defects is undesirable because it reduces the gas-separating ability of gas separator significantly.

SUMMARY OF THE INVENTION

The present invention has been made in view of the above problems of the prior art. The present invention provides a gas separator which hardly generates defects such as cracks and the like in the gas-separating layer and which exhibits excellent gas-separating ability, as well as to a method for producing a gas separator.

In order to solve the above problem, the present inventors studied gas separators and methods for producing gas separators. As a result, it was found that the above problem can be solved by constituting the gas-separating layer of the gas separator so as to contain, in addition to zeolite, a thermal expansion coefficient-adjusting material composed of a ceramic having a predetermined linear thermal expansion coefficient, thereby reducing the difference in thermal expansion coefficient of the porous substrate and gas-separating layer of the gas separator.

According to a first aspect of the present invention, a gas separator is provided, comprising a porous substrate composed of a first ceramic and a gas-separating layer containing zeolite disposed on the surface of the porous substrate. The gas-separating layer contains, in addition to zeolite, a thermal expansion coefficient-adjusting material composed of a second ceramic having a linear thermal expansion coefficient satisfying a relationship expressed by one of the following formulas (1) or (2) so that the difference between the thermal expansion coefficient of the porous substrate and the gas-separating layer can be reduced:

$$\beta_1 > \beta_{ZE}, \beta_2 > \beta_{ZE} \quad (1)$$

$$\beta_1 < \beta_{ZE}, \beta_2 < \beta_{ZE} \quad (2)$$

wherein $\beta_1$ is a linear thermal expansion coefficient of the first ceramic, $\beta_2$ is a linear thermal expansion coefficient of the second ceramic, and $\beta_{ZE}$ is a linear thermal expansion coefficient of the zeolite.

According to a second aspect of the present invention, the gas separator according to the first aspect further comprises a porous coat layer composed of a third ceramic having a linear thermal expansion coefficient satisfying a relationship expressed by one of the following formulas (3) or (4), disposed on the surface of the gas-separating layer:

$$\beta_1 > \beta_{ZE}, \beta_3 > \beta_{ZE} \quad (3)$$

$$\beta_1 < \beta_{ZE}, \beta_3 < \beta_{ZE} \quad (4)$$

wherein $\beta_1$ is a linear thermal expansion coefficient of the first ceramic, $\beta_3$ is a linear thermal expansion coefficient of the third ceramic, and $\beta_{ZE}$ is a linear thermal expansion coefficient of the zeolite.

According to a third aspect of the present invention, the gas separator according to the first or second aspects is provided, wherein the zeolite is composed of DDR (Deca-Dodecasil 3R) type zeolite.

According to a fourth aspect of the present invention, the gas separator according to any of first to third aspects is provided, wherein the first ceramic constituting the porous substrate and the second ceramic constituting the thermal expansion coefficient-adjusting material are both alumina ($Al_2O_3$).

According to a fifth aspect of the present invention, a method for producing a gas separator comprising a porous substrate composed of a first ceramic and a gas-separating layer containing zeolite, disposed on the surface of the porous substrate, by forming the gas-separating layer on the surface of the porous substrate is provided. The process includes the steps of coating a pretreatment slurry on the surface of a porous substrate composed of a first ceramic. The pretreatment slurry contains at least zeolite as seed crystals and a thermal expansion coefficient-adjusting material composed of a second ceramic having a linear thermal expansion coefficient satisfying a relationship expressed by one of the following formulas (1) or (2), to obtain a first coated substance. The method also includes dipping the first coated substance in a solution of raw materials for zeolite synthesis containing at least a structure-directing agent, water and a silicon (Si) source, conducting, in this state, a heat treatment (a hydrothermal synthesis of zeolite), and further conducting a heat treatment in an oxygen-containing atmosphere, to form a gas-separating layer on the surface of the porous substrate:

$$\beta_1 > \beta_{ZE}, \beta_2 > \beta_{ZE} \qquad (1)$$

$$\beta_1 < \beta_{ZE}, \beta_2 < \beta_{ZE} \qquad (2)$$

wherein $\beta_1$ is a linear thermal expansion coefficient of the first ceramic, $\beta_2$ is a linear thermal expansion coefficient of the second ceramic, and $\beta_{ZE}$ is a linear thermal expansion coefficient of the zeolite.

According to a sixth aspect of the present invention, the method for producing a gas separator according to the fifth aspect further comprises coating the pretreatment slurry on the surface of the porous substrate to obtain a first coated substance, coating, on the surface of the first coated substance, a slurry for the formation of a porous coat layer, containing at least particles of a third ceramic having a linear thermal expansion coefficient satisfying a relationship expressed by one of the following formulas (3) or (4), to obtain a second coated substance, and dipping the second coated substance in the solution of raw materials for zeolite synthesis. The method also includes conducting, in this state, a heat treatment (a hydrothermal synthesis of zeolite), and further conducting a heat treatment in an oxygen-containing atmosphere, to form the gas-separating layer on the surface of said porous substrate and form a porous coat layer on the surface of the gas-separating layer:

$$\beta_1 > \beta_{ZE}, \beta_3 > \beta_{ZE} \qquad (3)$$

$$\beta_1 < \beta_{ZE}, \beta_3 < \beta_{ZE} \qquad (4)$$

wherein $\beta_1$ is a linear thermal expansion coefficient of the first ceramic, $\beta_3$ is a linear thermal expansion coefficient of the third ceramic, and $\beta_{ZE}$ is a linear thermal expansion coefficient of the zeolite.

According to a seventh aspect of the present invention, the method for producing a gas separator according to the fifth or sixth aspects is provided, wherein the pretreatment slurry contains, as the zeolite, DDR (Deca-Dodecasil 3R) type zeolite and the solution of raw materials for zeolite synthesis contains 1-adamantaneamine as the structure-directing agent.

According to an eighth aspect of the present invention, the method for producing a gas separator according to the fifth to seventh aspects is provided, wherein the first ceramic constituting the porous substrate and the second ceramic constituting the thermal expansion coefficient-adjusting material are both alumina ($Al_2O_3$).

The gas separator of the present invention hardly generates defects such as cracks and the like in the gas-separating layer during its use and is excellent in gas-separating ability. The method for producing a gas separator according to the present invention can easily produce a gas separator which hardly generates defects such as cracks and the like in the gas-separating layer during its use and which is excellent in gas-separating ability.

BRIEF DESCRIPTION OF THE DRAWINGS

FIG. 1(a) and FIG. 1(b) are scanning electron microscope (SEM) micrographs showing the gas separator produced in Example 1. FIG. 1(a) shows the surface of the gas-separating layer, and FIG. 1(b) shows a section when the gas separator has been cut in its thickness direction.

FIG. 2(a) and FIG. 2(b) are SEM micrographs showing the gas separator produced in Comparative Example 1. FIG. 2(a) shows the surface of the gas-separating layer, and FIG. 2(b) shows a section when the gas separator has been cut in its thickness direction.

DETAILED DESCRIPTION OF THE INVENTION

In developing the gas separator and production method therefor according to the present invention, the present inventor made a study first on the reason why defects, such as cracks and the like, are generated in the gas-separating layer, in conventional gas separators comprising a porous substrate and a gas-separating layer containing zeolite, formed on the surface of the porous substrate.

As a result, it was found that in conventional gas separators, defects such as cracks and the like were generated when the difference between thermal expansion coefficients of the porous substrate and the gas-separating layer containing zeolite is large. That is, when a conventional gas separator is subjected to high temperature conditions (for example, during heat treatment or gas separation), heat stress acts on the gas-separating layer, which is fragile as compared with the porous substrate. Because the thermal expansion behaviors of the porous substrate and the gas-separating layer are different, defects such as cracks and the like are generated.

Hence, the present inventor conceived of constituting a gas-separating layer of the gas separator so as to contain, in addition to zeolite, a thermal expansion coefficient-adjusting material composed of a ceramic having a particular linear thermal expansion coefficient, thereby reducing the difference between the thermal expansion coefficient of the porous substrate and gas-separating layer of gas separator. Based on this novel idea, the gas separator and production method therefore have been developed.

Specific description is made below with respect to an embodiment of the gas separator and method for producing it of the present invention. It is to be noted, however, that the gas separator and production method therefore according to the present invention are not restricted to the following embodiment.

[1] Gas Separator

In the gas separator of the present invention, the gas-separating layer contains, in addition to zeolite, a thermal expansion coefficient-adjusting material composed of a ceramic having a particular linear thermal expansion coefficient, thereby the difference between the thermal expansion coefficient of the porous substrate and the gas-separating layer is reduced.

In such a gas separator, since the difference between the thermal expansion coefficient of the porous substrate and the gas-separating layer is reduced, defects such as cracks and the like are hardly generated in the gas-separating layer even when the gas separator has been exposed to high temperatures during the use (e.g. during gas separation). Therefore, a significant reduction in gas-separating ability, otherwise caused by the defects such as cracks and the like, can be effectively prevented.

The gas separator according to the present invention includes, as its constituent elements, a porous substrate and a gas-separating layer disposed on the surface thereof. In the present invention, the term "the porous substrate" refers to a member constituted by a ceramic, having a large number of pores communicating to one another three-dimensionally. This member functions as a substrate for the gas-separating layer and further has gas permeability characteristics that allow for the transmittance of gas.

The average pore diameter of the porous substrate used in the present invention is preferably 0.003 to 10 μm. An average pore diameter of less than 0.003 μm is not preferred because, with such an average pore diameter, the resistance (pressure loss) of gas-separating layer in gas permeation is large and there is a fear of a reduction in gas permeability of gas-separating layer (gas treatment ability of gas separator). Meanwhile, an average pore diameter of more than 10 μm is not preferred because of the fear of a significant reduction in the mechanical strength needed for the substrate for gas-separating layer.

Incidentally, the term "average pore diameter" used herein refers to a pore diameter measured by mercury porosimetry, and calculated from a pressure when the total volume of mercury forced into the porous substrate has become 50% of the total pore volume of the porous substrate.

The porosity of the porous substrate used in the present invention is preferably 20 to 60%, more preferably 25 to 40%. A porosity of less than 20% is not preferred because the resistance (pressure loss) of the gas-separating layer in gas permeation is large, and there is fear of reducing the gas permeability of the gas-separating layer (gas treatment ability of gas separator). Meanwhile, a porosity of more than 60% is not preferred because there is fear of a significant reduction in the mechanical strength needed for the substrate for gas-separating layer. Incidentally, the term "porosity" means a porosity measured by a mercury porosimeter.

As the ceramic constituting the porous substrate (hereinafter, the ceramic may be referred to as "first ceramic"), conventionally known ceramics including alumina, zirconia ($ZrO_2$), mullite ($3Al_2O_3 \cdot 2SiO_2$), etc can be used. In the present invention, however, a porous substrate composed of alumina is used particularly preferable because it is commercially available and can be produced to have highly pure, uniform, fine particles by a simple method of alkoxide hydrolysis.

In the present invention, there is no particular restriction as to the shape of the porous substrate. Various shapes such as sheet, hollow cylinder (pipe), honeycomb shape, monolithic shape (lotus root shape) and the like can be employed.

In the present invention, the term "gas-separating layer" is a layer containing zeolite, disposed on the surface of the above-mentioned porous substrate and has a characteristic selective gas permeability based on the crystal structure and chemical composition of the zeolite.

As to the zeolite content in the gas-separating layer, there is no particular restriction, and even a very small amount of zeolite in gas-separating layer is included in the range of the present invention. However, in order to obtain reliable gas-separating characteristics, the zeolite content is preferably 10% by mass or more, more preferably 40% by mass or more relative to the total mass of the gas-separating layer.

As the zeolite contained in the gas-separating layer, there are mentioned conventional known zeolites such as LTA, MFI, MOR, AFI, FER, FAU, DDR and the like. An appropriate zeolite may be selected from various zeolites of different crystal structures (different pore structures), depending upon the composition of mixed gas, the kind of gas to be separated and other conditions. In particular, DDR type zeolite, which has a characteristic of allowing for selective permeation of gas such as carbon dioxide ($CO_2$) or the like, can be used in an industrially useful applications such as carbon dioxide removal and the like. Therefore, among various zeolites, DDR type zeolite can be used particularly preferably.

Hence, in the gas separator of the present invention, the zeolite used therein is preferably a zeolite composed of DDR type zeolite. In the present invention, however, the term "the zeolite composed of DDR type zeolite" refers not only to a gas-separating layer whose zeolite is 100% DDR type zeolite but also to a gas-separating layer whose zeolite is substantially DDR type zeolite. Therefore, the gas-separating layer may contain impurities (including other type of zeolite) in such an extent that there is no hindrance of gas-separating ability.

The gas-separating layer is disposed on the surface of the porous substrate. As discussed above, the term "the surface of the porous substrate" differs depending upon the shape of the porous substrate. For example, when the shape of the porous substrate is a sheet, the surface means the upper side surface or the lower side surface; when the shape of the porous substrate is a shape having an inside space (e.g. through-holes), such as hollow cylinder (pipe), honeycomb shape, monolithic shape (lotus root shape) or the like, the surface refers not only to the outer surface but also to the surface of porous substrate surrounding its inside space. In the gas separator of the present invention, it is sufficient that the gas-separating layer is disposed on at least one side surface of "the surface of the porous substrate."

Incidentally, as to the thickness of the gas-separating layer, there is no particular restriction. However, the thickness is preferably 0.01 to 50 μm, more preferably 0.05 to 10 μm. A thickness of less than 0.01 μm is not preferred because, with such a thickness, there is a fear of crack generation in the gas-separating layer. Meanwhile, a thickness of more than 50 μm is not preferred because, with such a thickness, the resistance (pressure loss) of gas-separating layer in gas permeation is large and there is a fear of a reduction in gas permeability of gas-separating layer (gas treatment ability of gas separator).

In the gas separator of the present invention, the gas-separating layer contains, in addition to zeolite, a thermal expansion coefficient-adjusting material composed of a ceramic (hereinafter, may be referred to as "second ceramic") having a particular linear thermal expansion coefficient.

As the second ceramic constituting the thermal expansion coefficient-adjusting material, there is selected, when the linear thermal expansion coefficient $\beta_1$ of the first ceramic constituting the porous substrate is larger than the linear thermal expansion coefficient $\beta_{ZE}$ of the zeolite as shown in the following formula (1), a ceramic whose linear thermal expansion coefficient $\beta_2$ is larger than the linear thermal expansion coefficient $\beta_{ZE}$ of the zeolite. Meanwhile, when the linear thermal expansion coefficient $\beta_1$ of the first ceramic constituting the porous substrate is smaller than the linear thermal expansion coefficient $\beta_{ZE}$ Of the zeolite as shown in the following formula (2), there is selected a ceramic whose linear thermal expansion coefficient $\beta_2$ is smaller than the linear thermal expansion coefficient $\beta_{ZE}$ of the zeolite.

$$\beta_1 > \beta_{ZE}, \beta_2 > \beta_{ZE} \tag{1}$$

$$\beta_1 < \beta_{ZE}, \beta_2 < \beta_{ZE} \tag{2}$$

The thermal expansion coefficient-adjusting material composed of the second ceramic is contained in the gas-separating layer in an appropriate amount so that the difference between thermal expansion coefficient of the porous substrate and the gas-separating layer can be reduced thereby.

Incidentally, the term "the difference between the thermal expansion coefficient can be reduced" used herein means that, as shown in the following formulas (5) or (6), the linear thermal expansion coefficient $\beta_M$ of the gas-separating layer has a value between the linear thermal expansion coefficient $\beta_1$ of the first ceramic and the linear thermal expansion coefficient $\beta_{ZE}$ of the zeolite. That is, in the gas separator of the present invention, it is necessary that the content of the thermal expansion coefficient-adjusting material in the gas-separating layer is controlled so as to satisfy a relationship expressed by one of the following formulas (5) or (6):

$$\beta_1 > \beta_M > \beta_{ZE} \tag{5}$$

$$\beta_1 < \beta_M < \beta_{ZE} \tag{6}$$

In the gas separator of the present invention, there is no particular restriction as to the kind of the second ceramic constituting the thermal expansion coefficient-adjusting material, as long as the above condition is satisfied. However, the second ceramic is preferred to be the same kind as the first ceramic constituting the porous substrate. In such a constitution, even if the content of the thermal expansion coefficient-adjusting material in the gas-separating layer is not particularly controlled, the linear thermal expansion coefficient $\beta_M$ of the gas-separating layer has a value between the linear thermal expansion coefficient $\beta_1$ of the first ceramic and the linear thermal expansion coefficient $\beta_{ZE}$ of the zeolite. Thus, the difference in thermal expansion coefficient between the porous substrate and the gas-separating layer can be reduced quite easily.

In the present invention, a porous substrate composed of alumina which is easily available or easily produced is preferably used. Therefore, it is preferred that the first ceramic constituting the porous substrate and the second ceramic constituting the thermal expansion coefficient-adjusting material are both alumina.

In the gas separator of the present invention, there is no particular restriction as to the state of the presence of the thermal expansion coefficient-adjusting material, as long as the thermal expansion coefficient-adjusting material can reduce the difference in thermal expansion coefficient between the porous substrate and the gas-separating layer. For example, the thermal expansion coefficient-adjusting material and the zeolite may be dispersed uniformly, or the thermal expansion coefficient-adjusting material may be present so that its content in the gas-separating layer becomes gradually higher from the surface side of the gas-separating layer (or its porous coat layer side) toward the porous substrate side of the gas-separating layer.

Preferably, the gas separator of the present invention further comprises, on the surface of the gas-separating layer portion comprising the zeolite and the second ceramic, a porous coat layer composed of a ceramic (hereinafter, may be referred to as "third ceramic") having a particular linear thermal expansion coefficient. By employing such a constitution, the zeolite exposed on the surface of the gas-separating layer is covered with the porous coat layer and further there is formed, at the interface between the zeolite and the third ceramic constituting the porous coat layer, a composite layer of the zeolite and the third ceramic. As a result, the difference between the thermal expansion coefficient of the porous substrate and the gas-separating layer is more effectively reduced.

The third ceramic constituting the porous coat layer is selected for the same reasons as the second ceramic constituting the thermal expansion coefficient-adjusting material.

Preferably, the third ceramic is a ceramic whose linear thermal expansion coefficient $\beta_3$ is larger than the linear thermal expansion coefficient $\beta_{ZE}$ of the zeolite, when the linear thermal expansion coefficient $\beta_1$ of the first ceramic constituting the porous substrate is larger than the linear thermal expansion coefficient $\beta_{ZE}$ of the zeolite as shown in the following formula (3). Meanwhile, when the linear thermal expansion coefficient $\beta_1$ of the first ceramic is smaller than the linear thermal expansion coefficient $\beta_{ZE}$ of the zeolite as shown in the following formula (4), there is selected a ceramic whose linear thermal expansion coefficient $\beta_3$ is smaller than the linear thermal expansion coefficient $\beta_{ZE}$ of the zeolite.

$$\beta_1 > \beta_{ZE}, \beta_3 > \beta_{ZE} \tag{3}$$

$$\beta_1 < \beta_{ZE}, \beta_3 < \beta_{ZE} \tag{4}$$

The porous coat layer composed of the third ceramic selected as above is formed on the surface of the gas-separating layer in an appropriate thickness so that the difference between the thermal expansion coefficient of the porous substrate and the gas-separating layer is reduced. Incidentally, the term "the difference between the thermal expansion coefficient is reduced" means the same thing as described previously. That is, in the gas separator of the present invention, the above-mentioned relationship expressed by one of the formulas (5) or (6) also needs to be satisfied in the porous coat layer.

In the gas separator of the present invention, there is no particular restriction as to the kind of ceramic constituting the third ceramic in the porous coat layer, as long as the above condition is satisfied. However, the third ceramic is preferably the same as the first ceramic. By employing such a constitution, the linear thermal expansion coefficient $\beta_M$ of the gas-separating layer has a value between the linear thermal expansion coefficient $\beta_1$ of the first ceramic and the linear thermal expansion coefficient $\beta_{ZE}$ of the zeolite and therefore the difference in thermal expansion coefficient between the porous substrate and the gas-separating layer can be reduced very easily.

In the present invention, the porous substrate is preferred to be composed of alumina, as described previously. Therefore, it is preferred that the first ceramic constituting the porous substrate and the third ceramic constituting the porous coat layer are both alumina, and it is more preferable that the first ceramic constituting the porous substrate, the second ceramic constituting the thermal expansion coefficient-adjusting material and the third ceramic constituting the porous coat layer are all alumina.

[2] Method for Producing the Gas Separator

The above-described gas separator according to the present invention can be produced by forming, on the surface of a porous substrate composed of a ceramic, a gas-separating layer containing zeolite. More specifically, the production comprises the steps of:

coating, on the surface of a porous substrate composed of a first ceramic, a pretreatment slurry containing at least zeolite as seed crystals and a thermal expansion coefficient-adjusting material composed of a second ceramic having a particular linear thermal expansion coefficient, to obtain a first coated substance;

dipping the first coated substance in a solution of raw materials for zeolite synthesis containing at least a structure-directing agent, water and a silicon source;

conducting, in this state, a heat treatment (a hydrothermal synthesis of zeolite); and further conducting a heat treatment in an oxygen-containing atmosphere, to form a gas-separating layer on the surface of the porous substrate.

This production method reduces the difference between the thermal expansion coefficient of the porous substrate and the gas-separating layer. As a result, defects such as cracks and the like are hardly generated in the gas-separating layer even under high temperature conditions during production (e.g. during heat treatment). Accordingly, a gas separator which is free from defects such as cracks or the like and which exhibits excellent gas-separating characteristics can be easily obtained. Individual steps of the production method are described more specifically.

(i) Step of Coating Pretreatment Slurry

The first step of the production method of the present invention is a step of coating the pretreatment slurry on the surface of a porous substrate to obtain a first coated substance. The pretreatment slurry contains at least zeolite as seed crystals and a thermal expansion coefficient-adjusting material composed of a ceramic having a particular linear thermal expansion coefficient.

In the first step, a porous substrate composed of a ceramic is first prepared. As the average pore diameter, porosity and shape of the porous substrate and the ceramic (hereinafter, may be referred to as "first ceramic") constituting the porous substrate, there can be preferably used those described above in the section describing the gas separator. In particular, when a porous substrate having an average pore diameter of 10 μm or less is used, there is a productional merit in that a dense gas-separating layer can be formed thereon and defects are hardly generated in the gas-separating layer. An average pore diameter of 2 μm or less is preferred because a gas-separating layer can be obtained which has few defects, which is dense and thin, and which has excellent gas-separating and gas permeability (gas treatment ability) characteristics.

In the first step, a pretreatment slurry is coated on the surface of the above-mentioned porous substrate. In the production method of the present invention, "the pretreatment slurry" contains at least zeolite as seed crystals and a thermal expansion coefficient-adjusting material composed of a ceramic having a particular linear thermal expansion coefficient.

The seed crystals are a substance which becomes a nucleus in the formation and growth of zeolite crystals. By allowing the pretreatment slurry to contain the seed crystals, the formation and growth of zeolite crystals is promoted and a dense gas-separating layer can be easily formed.

There is used, as the zeolite as seed crystals, a zeolite to be contained in the gas-separating layer to be formed. For example, when it is intended to form a gas-separating layer containing DDR type zeolite, the DDR type zeolite may be used as the seed crystals.

There is no particular restriction as to the average particle diameter of the zeolite. However, a zeolite having an average particle diameter of 10 μm or less is preferably used. An average particle diameter of more than 10 μm is not preferred because the resulting gas-separating layer tends to have a large thickness, the resistance (pressure loss) of gas-separating layer in gas permeation is large, and the gas-separating layer may have a lower gas permeability (a lower gas treatment ability of gas separator). As the seed crystals, there may be used zeolite crystals per se; however, a fine zeolite powder obtained by grinding zeolite crystals as necessary (or further conducting classification) into a desired average particle diameter can be preferably used.

Incidentally, the term "average particle diameter" used herein means an average value of the maximum diameters of the 30 particles arbitrarily chosen in the visual field when an observation has been made using a scanning electron microscope (SCM).

As described previously, the thermal expansion coefficient-adjusting material needs to be constituted by a ceramic (hereinafter, may be referred to as "second ceramic") having a linear thermal expansion coefficient satisfying a relationship expressed by one of the following formulas (1) or (2). Particles having an average particle diameter of 10 μm or less are preferably used. Particles having an average particle diameter of more than 10 μm are not preferred because the resulting gas-separating layer tends to have a large thickness, the resistance (pressure loss) of gas-separating layer in gas permeation is large, and the gas-separating layer may have a lower gas permeability (a lower gas treatment ability of gas separator):

$$\beta_1 > \beta_{ZE}, \beta_2 > \beta_{ZE} \quad (1)$$

$$\beta_1 < \beta_{ZE}, \beta_2 < \beta_{ZE} \quad (2)$$

wherein $\beta_1$ is a linear thermal expansion coefficient of the first ceramic, $\beta_2$ is a linear thermal expansion coefficient of the second ceramic, and $\beta_{ZE}$ is a linear thermal expansion coefficient of the zeolite.

As to the kind of the second ceramic, there is no particular restriction, as long as the above condition is satisfied. However, for the same reasons described in the section describing the gas separator, it is preferred that the second ceramic is the same as the first ceramic constituting the porous substrate, and it is more preferable that the first ceramic and the second ceramic are both alumina.

The pretreatment slurry can be obtained by dispersing at least zeolite as seed crystals and a thermal expansion coefficient-adjusting material in a dispersing medium such as water or the like. Other additives (e.g. a dispersing agent) may be added as necessary. It is possible to disperse the zeolite and the thermal expansion coefficient-adjusting material at one time to prepare a pretreatment slurry, but it is also possible to prepare a zeolite-dispersed slurry and a thermal expansion coefficient-adjusting material-dispersed slurry separately and mixing these two kinds of slurries to prepare the pretreatment slurry.

The concentration of the thermal expansion coefficient-adjusting material in the pretreatment slurry is preferably 0.1 to 80% by mass relative to the total mass of the pretreatment slurry. A concentration of less than the above range is not preferred because the amount of the thermal expansion coefficient-adjusting material is insufficient, and the desired effect of reducing the difference between the thermal expansion coefficient of the porous substrate and the gas-separating layer may not be obtained. Meanwhile, a concentration exceeding the above range is not preferred because production of a uniform slurry may be difficult.

The concentration of the zeolite in the pretreatment slurry is preferably 0.01 to 60% by mass relative to the total mass of the pretreatment slurry. A concentration of less than the above range is not preferred because, with such a concentration, the zeolite density in the coated slurry layer is low, and accordingly, the gas-separating layer formed later tends to be hardly dense. Meanwhile, a concentration exceeding the above range is not preferred because the zeolite density in the coated slurry layer is high, and accordingly, the gas-separating layer formed later tends to have a large thickness; therefore, the resistance (pressure loss) of the gas-separating layer in gas permeation is large and the gas-separating layer may have a lower gas permeability (a lower gas treatment ability of gas separator).

The mixing ratio (mass ratio) of the zeolite and the thermal expansion coefficient-adjusting material in the pretreatment slurry may be determined appropriately depending upon the kind of thermal expansion coefficient-adjusting material and the desired level of reduction of the difference between the thermal expansion coefficient of the porous substrate and the gas-separating layer formed.

As to the method for dispersion, there is no particular restriction, and the dispersion may be conducted by a conventionally known method (e.g. mechanical stirring). For example, dispersion by ultrasonic treatment may be employed for securing the uniformity of the slurry composition. With a slurry of uniform composition, the pretreatment slurry can be coated more densely and in a uniform thickness.

As to the method of coating, there is no particular restriction, either, and an appropriate coating method can be selected from among conventionally known coating methods such as dropping, dipping, spin coating, printing and the like so as to meet the intended purpose. Among these, spin coating can be used preferably because it enables formation of a coated layer of homogeneity and uniform thickness.

As to the thickness of the coated slurry layer, there is no particular restriction. However, the thickness is preferably 0.01 to 50 μm. A thickness of less than the above range is not preferred because a sufficient reduction of the difference between the thermal expansion coefficient of the porous substrate and the resulting gas-separating layer may not be obtained. Meanwhile, a thickness exceeding the above range is not preferred because cracks may be generated in the coated slurry layer. By such a method, the pretreatment slurry is coated on at least either side surface of the porous substrate, whereby a first coated substance is obtained.

In the first step, it is required to coat the pretreatment slurry on the surface of the porous substrate to obtain a first coated substance, as described above. However, it is preferred that the first step further includes a step of coating a slurry for the formation of a porous coat layer, which comprises coating, on the surface of the first coated substance, a slurry for the formation of a porous coat layer containing ceramic particles of a third ceramic having a particular linear thermal expansion coefficient, to obtain a second coated substance. By employing such a method, the zeolite as seed crystals exposed on the surface of the coated layer of the pretreatment slurry is covered with the slurry for the formation of the porous coat layer and, moreover, there is formed, at the interface between the zeolite to be formed by hydrothermal synthesis in the next step and the third ceramic constituting the porous coat layer, a composite layer of the zeolite and the third ceramic. Thus, the difference between the thermal expansion coefficient of the porous substrate and the gas-separating layer is more effectively reduced.

In the step for coating the slurry for the formation of a porous coat layer, a slurry for the formation of the porous coat layer is coated on the surface of the first coated substance. In the production method of the present invention, the term "the slurry for the formation of the porous coat layer" contains at least ceramic particles of a ceramic having a particular linear thermal expansion coefficient.

As described above in connection with the gas separator, the ceramic particles need to be composed of a ceramic (hereinafter, may be referred to as "third ceramic") having a linear thermal expansion coefficient satisfying a relationship expressed by one of the following formulas (3) or (4). The ceramic particles are preferably particles having an average particle diameter of 10 μm or less. An average particle diameter of more than the above range is not preferred because the thickness of the resulting porous coat layer is large and cracks may be generated in the porous coat layer. As the seed crystals, zeolite crystals may be used per se; however, a fine ceramic powder obtained by as necessary grinding a commercial ceramic powder (or further classifying the ground powder) into a desired average particle diameter Can be preferably used:

$$\beta_1 > \beta_{ZE}, \beta_3 > \beta_{ZE} \tag{3}$$

$$\beta_1 < \beta_{ZE}, \beta_3 < \beta_{ZE} \tag{4}$$

wherein $\beta_1$ is a linear thermal expansion coefficient of the first ceramic, $\beta_3$ is a linear thermal expansion coefficient of the third ceramic, and $\beta_{ZE}$ is a linear thermal expansion coefficient of the zeolite.

As to the kind of the third ceramic, there is no particular restriction as long as the above condition is satisfied. However, for the same reasons described above in connection with the gas separator, it is preferred that the third ceramic is the same as the first ceramic constituting the porous substrate, it is more preferable that the first ceramic and the second ceramic are both alumina, and it is particularly preferred that the first ceramic, the second ceramic and the third ceramic are all alumina.

The slurry for the formation of the porous coat layer can be obtained by dispersing at least ceramic particles of a third ceramic in a dispersing medium (e.g. water). Other additives (e.g. a dispersing agent) may be added as necessary.

The concentration of the ceramic particles in the slurry for the formation of the porous coat layer is preferably 0.1 to 80% by mass relative to the total mass of the slurry for formation of porous coat layer. A concentration of less than the above range is not preferred because the amount of the thermal expansion coefficient-adjusting material is insufficient, and the difference between the thermal expansion coefficient of the porous substrate and the gas-separating layer may not be sufficiently reduced. Meanwhile, a concentration exceeding the above range is not preferred because the production of a uniform slurry may be difficult.

The dispersion and coating of the slurry for the formation of the porous coat layer may be conducted in a manner similar to those of the pretreatment slurry. As to the thickness of the coated layer, there is no particular restriction, but the thickness is preferably 50 μm or less. A thickness of more than the above range is not preferred because cracks may be generated in the coated layer. By such a method, the slurry for the formation of the porous coat layer is coated on at least either side surface of the first coated substance to obtain a second coated substance.

(ii) Step of Forming the Gas-Separating Layer

The second step of the production method of the present invention is a step for formation of gas-separating layer, which comprises dipping the first coated substance (or the second coated substance) in a solution of raw materials for zeolite synthesis containing at least a structure-directing agent, water and a silicon source, conducting, in this state, a heat treatment (a hydrothermal synthesis of zeolite), and further conducting a heat treatment in an oxygen-containing atmosphere.

In the production method of the resent invention, "the solution of raw materials for zeolite synthesis" is a solution containing at least a structure-directing agent, water and a silicon source. The term "the structure-directing agent" used herein refers to a substance which functions as a template for formation of the crystal structure of a zeolite to be synthesized. For example, when it is intended to form a gas-separating layer containing DDR type zeolite, 1-adamantaneamine is used as the structure-directing agent. Water acts as a solvent in synthesis (hydrothermal synthesis) of zeolite.

The silicon source is a substance which functions as a raw material for zeolite, and a silica sol is generally used preferably. The silica sol may be preferably a commercial silica sol, but may be produced by dissolving a silica fine powder in water or by hydrolyzing an alkoxysilane.

In the production method of the present invention, the solution of the raw material for zeolite synthesis may contain substances other than the structure-directing agent, water and the silicon source. By allowing the solution to contain, for example, an aluminum source and a cation source, there can be produced a low-silica type zeolite which contains aluminum and a metallic cation in the crystal structure and whose absorptivity and catalyst performance are different from those of all-silica type zeolites. As the aluminum source, there can be preferably used aluminum sulfate, sodium aluminate, metallic aluminum, etc.; as the cation source, there can be preferably used sodium hydroxide and alkali metal salts such as sodium aluminate and the like.

The composition of the solution of raw materials for zeolite synthesis differs depending upon the kind of a zeolite to be synthesized. Therefore, the solution composition is determined depending upon the conventional known method for synthesis of an intended zeolite. Description is made below on a preferred solution composition when the zeolite to be synthesized is DDR type zeolite.

1-Adamantaneamine (which is a structure-directing agent) is a substance which functions as a template for forming the crystal structure of DDR type zeolite. Therefore, the molar ratio of this substance and silica (which is a raw material for DDR type zeolite and is a silicon source) is important. The molar ratio of 1-adamantaneamine and silica is preferably in a range of 0.03 to 0.5, more preferably in a range of 0.0625 to 0.375. When the molar ratio of 1-adamantaneamine and silica is less than the above range, the amount of 1-adamantaneamine is insufficient and the formation of DDR type zeolite may be difficult. Meanwhile, a molar ratio of more than the above range is not preferred from the standpoint of production cost because more expensive 1-adamantaneamine than necessary is added.

Incidentally, since 1-adamantaneamine is sparingly soluble in water (which is a solvent in hydrothermal synthesis), it is preferred to dissolve 1-adamantaneamine in ethylenediamine and then use the resulting solution in preparation of a solution of raw materials for zeolite synthesis. By completely dissolving 1-adamantaneamine in ethylenediamine to prepare a uniform solution of raw materials, there can be formed DDR type zeolite uniform in crystal size.

The ethylenediamine/1-adamantaneamine molar ratio is preferably in a range of 4 to 35, more preferably in a range of 8 to 24, particularly preferably in a range of 10 to 16. When the ethylenediamine/1-adamantaneamine molar ratio is less than the above range, the amount of ethylenediamine is insufficient and complete dissolution of 1-adamantaneamine may be difficult. Meanwhile, a molar ratio of more than the above range is not preferred from the standpoint of production cost because more than a necessary amount of expensive ethylenediamine is added.

The molar ratio of water (which is a solvent in hydrothermal synthesis) and silica (which is a raw material for DDR type zeolite) (when a silica sol is used, the molar ratio is calculated from the solid content), that is, the water/silica molar ratio is preferably in a range of 10 to 500, more preferably in a range of 14 to 250, particularly preferably in a range of 14 to 112. A water/silica molar ratio of less than the above range is not preferred because the silica concentration in the solution of raw materials is too high, and accordingly, non-crystallized silica may remain in a large amount. Meanwhile, a water/silica molar ratio of more than the above range is not preferred because the silica concentration in the solution of raw materials is too low, and accordingly, formation of DDR type zeolite may be difficult.

When the solution of raw materials contains an aluminum source and a cation source, that is, when DDR type zeolite of low-silica type is produced, it is preferred to prepare a solution of raw materials so as to have the following composition.

The silica/alumina molar ratio (when the aluminum in aluminum source is calculated as aluminum oxide) is preferably in a range of 50 to 1,000, more preferably in a range of 70 to 300, particularly preferably in a range of 90 to 200. A silica/alumina molar ratio of less than the above range is not preferred because the ratio of amorphous silica other than DDR type zeolite may be high. Meanwhile, a molar ratio of more than the above ratio is not preferred because although DDR type zeolite can be produced, the amount of aluminum and cation is significantly small, and consequently, there is a fear that the properties of DDR type zeolite of low-silica type are not exhibited (that is, there is no difference of the formed zeolite from DDR type zeolite of all-silica type).

The alkali metal oxide/alumina molar ratio (when the alkali metal in cation source has been calculated as an oxide) is preferably in a range of 1 to 25, more preferably in a range of 3 to 20, particularly preferably in a range of 6 to 15. An alkali metal oxide/alumina molar ratio of less than this range is not preferred because it is difficult to obtain DDR type zeolite having an intended silica/alumina molar ratio. Meanwhile, an alkali metal oxide/alumina molar ratio of more than the above range is not preferred because the ratio of amorphous silica other than DDR type zeolite may be high.

Description has been made above of a preferred composition of a raw material solution when the zeolite to be synthesized is DDR type zeolite. The raw materials solution having such a composition can be obtained preferably, for example, by mixing, in the above-mentioned ratio, a solution of 1-adamantaneamine in ethylenediamine, water as a solvent, and a silica sol as a silicon source (and further, when DDR type zeolite of low-silica type is to be synthesized, aluminum sulfate as an aluminum source and sodium hydroxide as a cation source).

In the second step, the first coated substance (or the second coated substance) is dipped in the above-obtained raw materials solution for zeolite synthesis and, in this state, a heat treatment is conducted to synthesize zeolite (hydrothermal synthesis of zeolite).

The conditions and method of zeolite hydrothermal synthesis differ depending upon the kind of the zeolite to be synthesized and, therefore, are appropriately selected from conventionally known synthesis methods of various zeolites. Description is made below on preferred conditions and method of zeolite hydrothermal synthesis when the zeolite to be synthesized is DDR type zeolite.

The temperature for hydrothermal synthesis is preferably in a range of 130 to 200° C. A hydrothermal synthesis temperature of less than this range is not preferred because formation of DDR type zeolite may be difficult. Meanwhile, a temperature of more than the above range is not preferred because DOH (Dodecasil 1H) type zeolite (which is not an intended product) may be formed owing to phase transition.

The time for the hydrothermal synthesis may be 1 to 5 days (which is an extremely short time). In the production method of the present invention, zeolite as seed crystals is adhered on the surface of the porous substrate, whereby the formation and growth of DDR type zeolite is promoted.

Incidentally, in the conventional production method of DDR type zeolite, there were cases that mixed crystals of DDR and DOH were formed unless the raw materials solution is stirred incessantly. However, in the above method of dissolving 1-adamantaneamine in ethylenediamine, the raw materials solution is maintained in a uniform state, making possible, in hydrothermal synthesis, the formation of single-phase crystals of DDR without incessant stirring of the raw materials solution.

In the second step, after zeolite has been synthesized as above, a heat treatment is conducted in an oxygen-containing atmosphere. By this heat treatment, the structure-directing agent remaining in the zeolite synthesized can be burnt out.

The conditions for the heat treatment differ depending upon the kind of the structure-directing agent used, etc. For example, when the structure-directing agent is 1-adamantaneamine (that is, the zeolite to be synthesized is DDR type zeolite), heating is conducted in the atmosphere at 650 to 900° C. for 1 to 10 hours, whereby the 1-adamantaneamine remaining in the zeolite synthesized can be burnt out.

EXAMPLES

A gas separator and production method therefor according to the present invention are described below more specifically by way of examples of gas separators whose gas-separating layer contains DDR type zeolite. However, the present invention is in no way restricted to these examples. In the following Examples and Comparative Example, alumina, having an average linear thermal expansion coefficient of $7.7 \times 10^{-6}/°$ C. and a DDR type zeolite having an average linear thermal expansion coefficient of $2.7 \times 10^{-6}/°$ C. were used. These average linear thermal expansion coefficients are each an average of linear thermal expansion coefficients in a temperature range of 50 to 700° C.

Example 1

Production of DDR Type Zeolite Powder as Seed Crystals

A DDR type zeolite powder having an average particle diameter of about 100 μm was produced according to the method for production of DDR type zeolite, described in M. J. den Exter, J. C. Jansen, H. van Bekkum, Studies in Surface Science and Catalysis vol. 84, Ed. By J. Weitkamp et al., Elsevier (1994) 1159-1166.

[Preparation of the Pretreatment Slurry]

First, 5 g of the above-produced DDR type zeolite powder and 32 g of water were placed in a polyethylene-made vessel which contained a large number of zirconia grinding balls (a grinding medium) of 2 mm in diameter. Wet grinding was conducted in a pot mill for 90 hours to convert the DDR type zeolite powder into a fine powder having an average particle diameter of 0.6 μm or less, whereby was obtained a seed crystals slurry.

Separately, 30 g of water (a dispersing medium), 1.35 g of a synthetic carboxylic acid salt (a dispersing medium) [Aron A-6114 (trade name), a product of Toagosei Co., Ltd.], and 45 g of alumina particles (a thermal expansion coefficient-adjusting material) [AKP-15 (trade name), a product of Sumitomo Chemical Co., Ltd.] were dispersed and mixed to obtain an alumina slurry.

0.07 g of the above-obtained seed crystals slurry and 0.17 g of the above-obtained alumina slurry were mixed. Thereto was added water so as to give a total volume after water dilution, of 5.6 g, to prepare a slurry for pretreatment. In this pretreatment slurry, the concentration of the thermal expansion coefficient-adjusting material was 1.8% by mass, the concentration of the zeolite was 0.2% by mass, and the mixing ratio (mass ratio) of the zeolite and the thermal expansion coefficient-adjusting material was 1:9.

[Coating the Pretreatment Slurry]

An alumina porous disc, used as a porous substrate having an outer diameter of 14 mm, a thickness of 1.5 mm and an average pore diameter of 0.2 μm, was placed on a support of a spin coater [1H-D7 (trade name), a product of Mikasa K. K.]. While the support (resultantly, the porous substrate) was rotated at 8,000 rpm, one drop of the above-prepared slurry for pretreatment was dropped onto the center of the porous substrate to coat the pretreatment slurry on the surface of the porous substrate, whereby was obtained a first coated substance. The thickness of the coated layer was 0.2 μm.

[Formation of Gas-Separating Layer]

2.9 g of ethylenediamine produced by Wako Pure Chemical Industries, ltd. and 0.45 g of 1-adamantanamine (a structure-directing agent) produced by Katayama Kagaku Kogyo K. K. were poured into a 100-ml wide-mouthed bottle made of a fluoroplastic. They were made into a complete solution so that there was no precipitate of 1-adamantaneamine.

Separately, 37.7 g of water was placed in a beaker, followed by the addition of 7.65 g of a 30 mass % silica sol [Snowtex S, a product of Nissan Chemical Industries, ltd.]. The mixture was stirred lightly and poured into the above wide-mouthed bottle containing an ethylenediamine solution of 1-adamantaneamine. The resulting mixture was subjected to vigorous shaking for mixing. The wide-mouthed bottle was set in a shaker and subjected to shaking again for mixing, at 500 rpm for 1 hour, to prepare a solution of raw materials for zeolite synthesis. In this solution of raw materials for zeolite synthesis, the 1-adamantaneamine/silica molar ratio was 0.0785, the water-silica molar ratio was 63, and the ethylenediamine/1-adamantaneamine molar ratio was 16.

The above-prepared solution of raw materials for zeolite synthesis was transferred into a stainless steel-made pressure vessel with a fluoroplastic-made inner cylinder of 100 ml in internal volume. In the pressure vessel was vertically placed the previously-obtained first coated substance in a state that the first coated substance was dipped in the solution of raw materials for zeolite synthesis. The pressure vessel was placed in a drier whose inside temperature was controlled at 135° C., to conduct a hydrothermal synthesis. After the hydrothermal synthesis, the porous substrate was taken out, washed with water, dried at 80° C., heated to 700° C. in the atmosphere at a temperature elevation rate of 0.1° C./min in an electric furnace, and kept at that temperature for 4 hours to conduct a heat treatment. Then, the resulting substance was cooled to room temperature (about 25° C.) at a temperature lowering rate of 1° C./min, to obtain a gas separator comprising a porous substrate and a gas-separating layer formed on the surface of the porous substrate.

For the gas separator, the crystal phase of the gas-separating layer was examined by X-ray diffraction. As a result, only the diffraction peaks of DDR type zeolite and alumina were detected clearly and no halo was detected. That is, the zeolite constituting the gas-separating layer was confirmed to be complete crystals of DDR type zeolite.

Figure 1A:
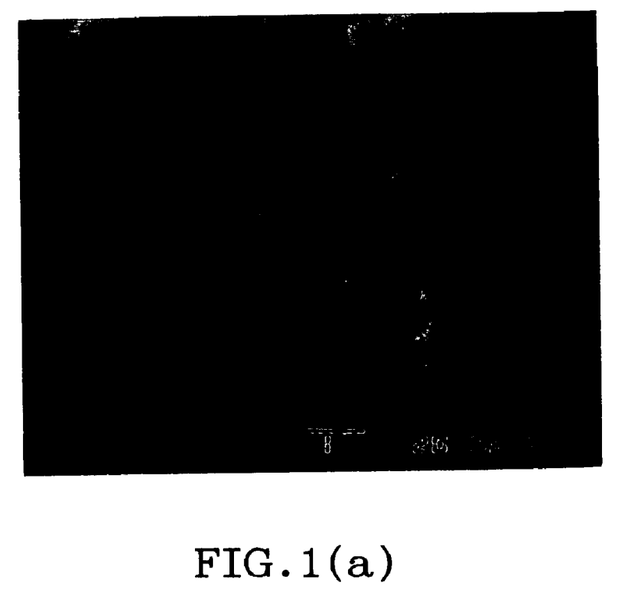
Figure 1B:
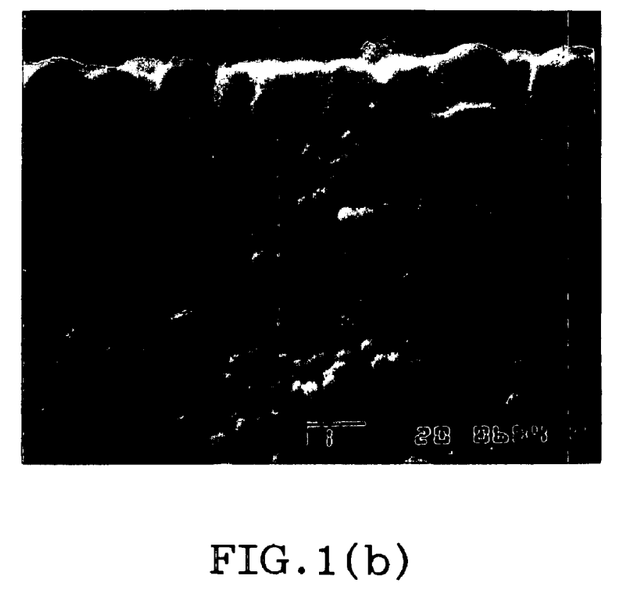

FIG. 1(a) and FIG. 1(b) are electron micrographs showing the gas separator produced in Example 1, observed with a scanning electron microscope (SEM). FIG. 1(a) shows the surface of the gas-separating layer, and FIG. 1(b) shows a section when the gas separator has been cut in its thickness direction. It was found from these micrographs that a dense film of 2 μm in thickness had been formed on the surface of the porous substrate of the gas separator. Further, as is clear from FIG. 1(a) and FIG. 1(b), no crack was observed in the gas-separating layer of the gas separator.

Incidentally, "the diffraction peak of DDR type zeolite" in X-ray diffraction is a diffraction peak described in No. 38-651 corresponding to Deca-dodecasil 3R or 41-571, shown in International Center for Diffraction Data (ICDD), "Powder Diffraction File". With regard to the crystal phase of zeolite, a case where only a broad halo indicating amorphous silica was observed and no clear peak was observed in the range of 2θ=20 to 30° ($CuK_\alpha$) of X-ray diffraction, was expressed as "amorphous"; a case where a peak of DDR type zeolite was observed even slightly, was expressed as "in the course of crystallization"; and a case where a peak indicating DDR type zeolite was observed clearly and there was no halo, was expressed as "complete crystals".

Example 2

A gas separator was produced in the same manner as in Example 1 except that 0.32 g of the seed crystals slurry prepared in Example 1 and 0.12 g of the alumina slurry prepared in Example 1 were mixed. Water was added thereto so that the total volume after water dilution became 6.1 g, to prepare a pretreatment slurry; the alumina slurry prepared in Example 1 was diluted two-fold to use as a slurry for the formation of the porous coat layer, and this slurry was coated on the surface of the first coated substance in the same manner as in coating of the pretreatment slurry, to obtain a second coated substance; and this second coated substance was subjected to a hydrothermal synthesis for synthesis of zeolite and further a heat treatment was conducted.

In the pretreatment slurry, the concentration of the thermal expansion coefficient-adjusting material was 1.2% by mass; the concentration of the zeolite was 0.8% by mass; and the mixing ratio (mass ratio) of the zeolite and the thermal expansion coefficient-adjusting material was 2:3. In the slurry for the formation of the porous coat layer, the concentration of the alumina particles was 30% by mass. Further, the thickness of the coated layer in the first coated substance was 0.2 μm and the thickness of the coated layer in the second coated substance was 5 μm.

For the gas separator, the crystal phase of the gas-separating layer was examined by X-ray diffraction. As a result, only the diffraction peaks of DDR type zeolite and alumina were detected clearly and no halo was detected. That is, the zeolite constituting the gas-separating layer was confirmed to be complete crystals of DDR type zeolite.

Comparative Example 1

A gas separator was produced in the same manner as in Example 1 except that only the seed crystals slurry prepared in Example 1 were coated on the surface of the porous substrate to obtain a coated substance. This coated substance was subjected to a hydrothermal synthesis for synthesis of zeolite, and a further heat treatment was conducted. The zeolite concentration in the seed crystals slurry was 1.6% by mass, and the thickness of the coated layer in the coated substance was 0.2 μm.

For the gas separator, the crystal phase of the gas-separating layer was examined by X-ray diffraction. As a result, only the diffraction peaks of DDR type zeolite and alumina were detected and no halo was detected. That is, the zeolite constituting the gas-separating layer was confirmed to be complete crystals of DDR type zeolite.

Figure 2A:
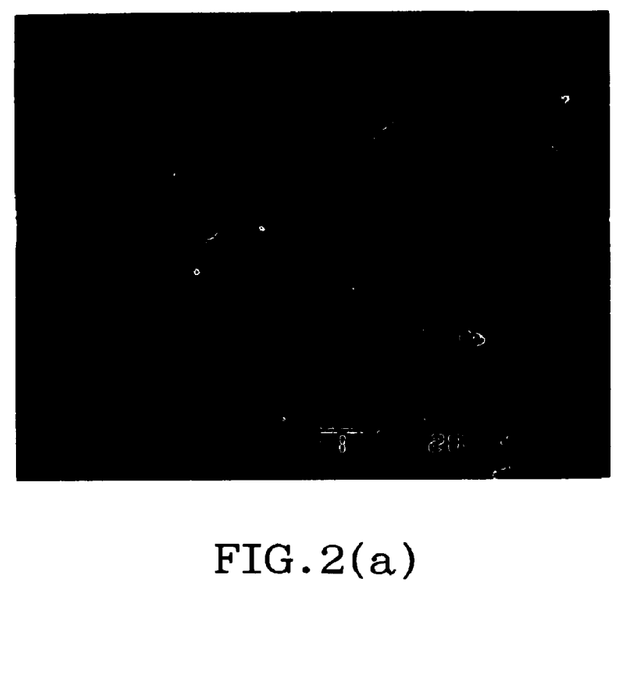
Figure 2B:
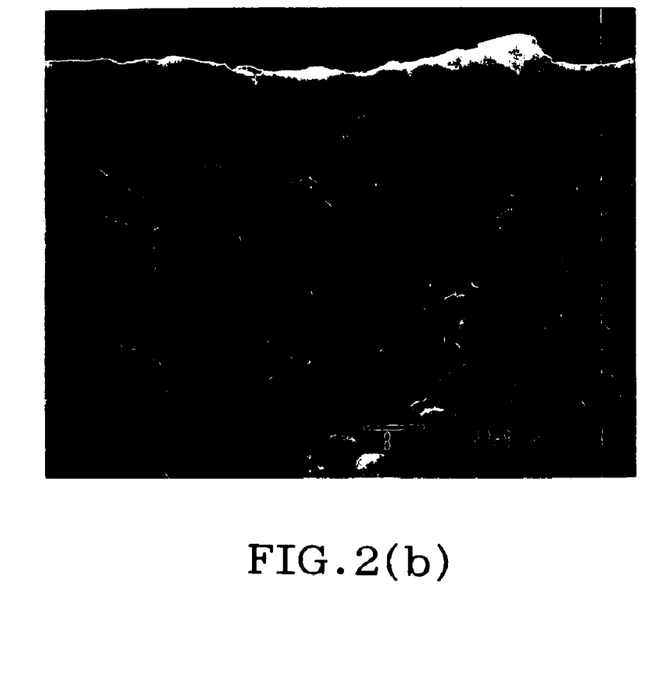

FIG. 2(a) and FIG. 2(b) are electron micrographs showing the gas separator produced in Comparative Example 1, observed with a scanning electron microscope (SEM). FIG. 2(a) shows the surface of the gas-separating layer, and FIG. 2(b) shows a section when the gas separator has been cut in its thickness direction. It was found from these micrographs that a dense film of 2 μm in thickness had been formed on the surface of the porous substrate. However, cracks were observed in the gas-separating layer, as is clear from FIG. 2(a).

(Permeation Test for Mixed Gas)

Figure 3:
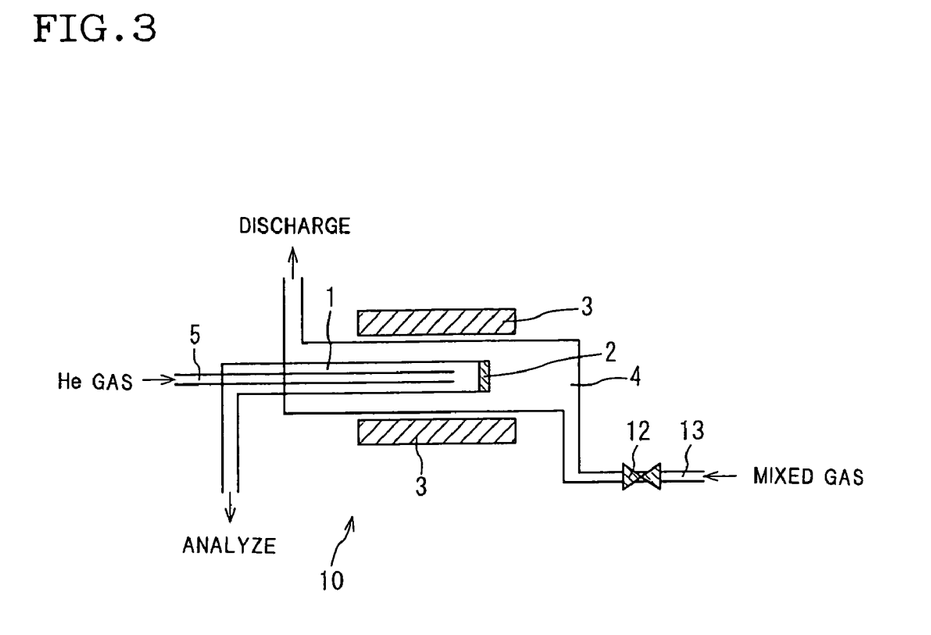
FIG. 3 is a schematic view showing the constitution of a gas permeation tester used in a mixed gas permeation test.

A permeation test for mixed gas was conducted using the gas separators produced in Example 1, Example 2 and Comparative Example 1. FIG. 3 is a schematic view showing the constitution of a gas permeation tester 10 used in the permeation test for mixed gas. This gas permeation tester 10 had a triple tube structure comprising a furnace tube 4 (outer diameter: 28 mm, inner diameter: 25 mm) of a tubular furnace 3, an aluminum-made measurement tube 1 (outer diameter: 15 mm, inner diameter: 11 mm) having, at the front end, a gas separator 2 processed into a particular shape (the measurement tube 1 was inserted into the furnace tube 4), and a quartz tube 5 (outer diameter: 6 mm, inner diameter: 4 mm) inserted into the measurement tube 1 as far as the vicinity of the gas separator 2.

A mixed gas consisting of equal mols of methane ($CH_4$) and carbon dioxide ($CO_2$) was introduced into outside the measurement tube 1 (inside the furnace tube 4) at a rate of 100 ml/min from a gas inlet 13 via a valve 12. Into the quartz tube 5 inside the measurement tube 1 was introduced helium gas (a sweep gas) for recovery of a gas which has permeated the gas separator 2, at a rate of 100 ml/min. In this state, the system was allowed to stand at room temperature (26° C.) for 1 hour or more to obtain a steady state. The recovery gas including the gas which had permeated the gas separator 2, was collected and analyzed by gas chromatography, whereby the permeation amount ($mmol \cdot m^{-2} \cdot sec^{-1}$) of the gas (carbon dioxide) from the separating layer was examined and separation coefficient α was determined using the following formula (7). The results are shown in Table 1.

$$\alpha = (Q_A/Q_B)/(P_{AO}/P_{BO}) \quad (7)$$

wherein α is a separation coefficient; $Q_A$ is a permeation amount ($mmol \cdot m^{-2} \cdot sec^{-1}$) of carbon dioxide; $Q_B$ is a permeation amount ($mmol \cdot m^{-2} \cdot sec^{-1}$) of methane; $P_{AO}$ is a partial pressure of carbon dioxide in mixed gas; $P_{BO}$ is a partial pressure of methane in mixed gas.

TABLE 1

|  | Separation coefficient | Permeation amount of carbon dioxide ($mmol \cdot m^{-2} \cdot sec^{-1}$) |
| --- | --- | --- |
| Example 1 | 7 | 21.5 |
| Example 2 | 524 | 8.7 |
| Comparative Example 1 | 1 | 38.6 |

(Summary)

As is clear from Table 1, the gas separators of Example 1 and Example 2 had no cracks (defects) in their gas-separating layers, and accordingly, showed good results in both gas-separating ability and gas permeability. The gas separator of Example 2, in particular, had a porous coat layer and accordingly was larger in the thickness of gas-separating layer and less in crack. As a result, the gas separator of Example 2 had a larger separation coefficient and was superior in gas-separating ability.

Meanwhile, the gas separator of Comparative Example 1 had a separation coefficient of 1 and had no separation ability for a mixture of methane and carbon dioxide. That is, the gas separator had cracks (defects) in the gas-separating layer and accordingly was significantly low in gas-separating ability.

INDUSTRIAL APPLICABILITY

The gas separator of the present invention is preferably used particularly in gas separation utilizing the pores inherently possessed by zeolite, for example, in selective separation of carbon dioxide ($CO_2$) or the like from a mixed gas such as natural gas or the like.

The invention claimed is:

1. A gas separator comprising:
    a porous substrate comprising a first ceramic; and
    a gas-separating layer comprising zeolite disposed on a surface of said porous substrate;
    wherein said gas-separating layer further comprises, in addition to said zeolite, a thermal expansion coefficient-adjusting material comprising a second ceramic having a linear thermal expansion coefficient satisfying a relationship expressed by one of the following formulas (1) or (2), so that a difference between a thermal expansion coefficient of said porous substrate and a thermal expansion coefficient of said gas-separating layer is reduced:

$$\beta_1 > \beta_{ZE}, \beta_2 > \beta_{ZE} \quad (1)$$

$$\beta_1 < \beta_{ZE}, \beta_2 < \beta_{ZE} \quad (2)$$

wherein $\beta_1$ is a linear thermal expansion coefficient of said first ceramic, $\beta_2$ is a linear thermal expansion coefficient of the said second ceramic, and $\beta_{ZE}$ is a linear thermal expansion coefficient of said zeolite.

2. The gas separator according to claim 1, further comprising a porous coat layer comprising a third ceramic having a linear thermal expansion coefficient satisfying a relationship expressed by one of the following formulas (3) or (4), disposed on the surface of said second ceramic:

$$\beta_1 > \beta_{ZE}, \beta_3 > \beta_{ZE} \quad (3)$$

$$\beta_1 < \beta_{ZE}, \beta_3 < \beta_{ZE} \quad (4)$$

wherein $\beta_1$ is a linear thermal expansion coefficient of the first ceramic, $\beta_3$ is a linear thermal expansion coefficient of the third ceramic, and $\beta_{ZE}$ is a linear thermal expansion coefficient of the zeolite.

3. The gas separator according to claim 1, wherein said zeolite comprises DDR (Deca-Dodecasil 3R) type zeolite.

4. The gas separator according to claim 1, wherein said first ceramic and said second ceramic are both alumina.

5. A method for producing a gas separator comprising a porous substrate comprising a first ceramic and a gas-separating layer comprising zeolite disposed on a surface of said porous substrate, said method comprising the steps of:
    coating a surface of a porous substrate with a pretreatment slurry comprising at least zeolite seed crystals and a thermal expansion coefficient-adjusting material which comprises a second ceramic having a linear thermal expansion coefficient satisfying a relationship expressed by one of the following formulas (1) or (2), to obtain a first coated substance, $$\beta_1 > \beta_{ZE}, \beta_2 > \beta_{ZE} \quad (1)$$

$$\beta_1 < \beta_{ZE}, \beta_2 < \beta_{ZE} \quad (2)$$

wherein $\beta_1$ is a linear thermal expansion coefficient of said first ceramic, $\beta_2$ is a linear thermal expansion coefficient of said second ceramic, and $\beta_{ZE}$ is a linear thermal expansion coefficient of said zeolite;
    dipping said first coated substance in a solution of zeolite synthesis raw materials comprising at least a structure-directing agent, water and a silicon source;
    conducting, in this state, a heat treatment step to perform hydrothermal synthesis of zeolite; and
    conducting a further heat treatment step, in an oxygen-containing atmosphere, to form said gas-separating layer on said surface of said porous substrate.

6. The method for producing a gas separator according to claim 5, further comprising the steps of:
    after coating said pretreatment slurry on said surface of said porous substrate to obtain said first coated substance, coating a surface of said first coated substance, with a slurry for a porous coat layer which comprises at least particles of a third ceramic having a linear thermal expansion coefficient satisfying a relationship expressed by one of the following formulas (3) or (4), to obtain a second coated substance, $$\beta_1 > \beta_{ZE}, \beta_3 > \beta_{ZE} \quad (3)$$

$$\beta_1 < \beta_{ZE}, \beta_3 < \beta_{ZE} \quad (4)$$

wherein $\beta_1$ is a linear thermal expansion coefficient of the first ceramic, $\beta_3$ is a linear thermal expansion coefficient of the third ceramic, and $\beta_{ZE}$ is a linear thermal expansion coefficient of the zeolite;
    dipping said second coated substance in said solution of zeolite synthesis raw materials;
    conducting, in this state, a heat treatment step to perform hydrothermal synthesis of zeolite; and
    conducting a further heat treatment step, in an oxygen-containing atmosphere, to form said gas-separating layer on said surface of said porous substrate and to form said porous coat layer on said surface of said gas-separating layer.

7. The method for producing a gas separator as set forth in claim 5, wherein said zeolite in said pretreatment slurry comprises DDR (Deca-Dodecasil 3R) type zeolite, and wherein said structure-directing agent of said solution of zeolite synthesis raw materials comprises 1-adamantaneamine.

8. The method for producing a gas separator as set forth in claim 5, wherein said first ceramic and said second ceramic are both alumina.

9. The method for producing a gas separator as set forth in claim 6, wherein said zeolite in said pretreatment slurry comprises DDR (Deca-Dodecasil 3R) type zeolite, and wherein said structure-directing agent of said solution of zeolite synthesis raw materials comprises 1-adamantaneamine.

* * * * *